Patented Jan. 17, 1928.

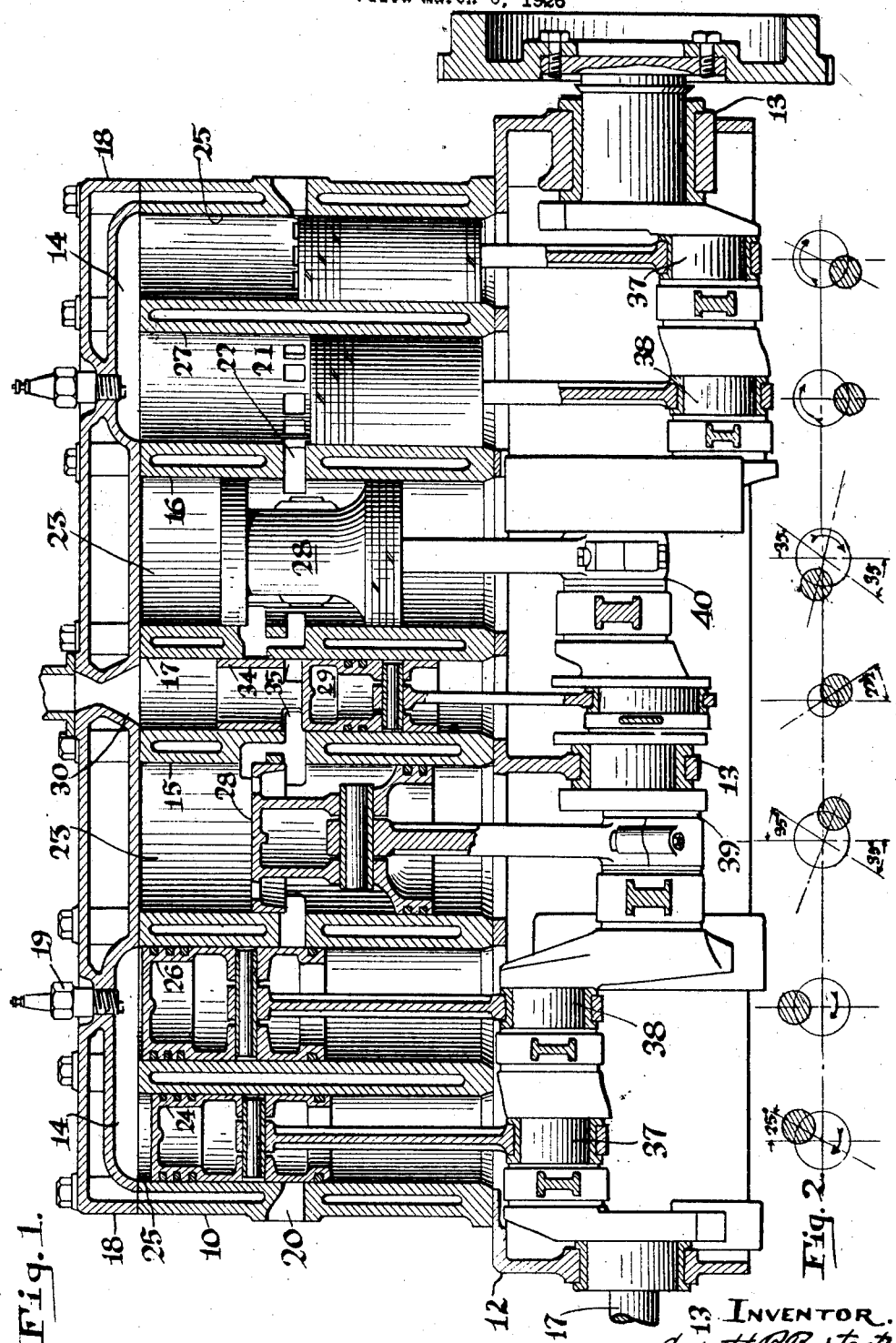

1,656,315

UNITED STATES PATENT OFFICE.

EVERETT R. BURTNETT, OF LOS ANGELES, CALIFORNIA, ASSIGNOR, BY DIRECT AND MESNE ASSIGNMENTS, TO THE AUTOMOTIVE VALVES CORPORATION, OF RENO, NEVADA, A CORPORATION OF NEVADA.

INTERNAL-COMBUSTION ENGINE.

Application filed March 8, 1926. Serial No. 93,068.

My invention relates to internal combustion engines of the two stroke cycle type wherein one separate cylinder and piston is employed for each combustion unit to provide fresh charge induction to the combustion chamber.

The principal objects of my invention are to provide, first, a pair of dual cylinder combustion chambers, a pair of single cylinder charge pumping chambers, for charge induction to the pair of dual cylinder combustion chambers and a single piston valve cylinder, all of straight diameter bore, the combustion, charge pumping and piston valve cylinder being arranged in a row, with two combustion cylinders arranged at each end of the row of cylinders, with one charge pumping cylinder arranged adjacent each pair of combustion cylinders and the single piston valve cylinder arranged in the row of cylinders between the two charge pumping cylinders, to a facilitate gang boring of the cylinders in production, to provide a constant fresh charge column movement, without surge in the passage between the source of supply and the charge pumping chambers, to provide a transfer duct between the respective charge pump and combustion chambers, which is substantially only a port in the cylinder wall, an advantage to the volumetric of the volume transferred.

Second, to provide in combination with each single cylinder charge pumping chamber, a combustion chamber of two cylinders, with a piston arranged for reciprocatory movement within each of the two combustion clyinders, one of the two cylinders of each pair of combustion cylinders, having a piston small in stroke sweep displacement, relative to the other cylinder of the pair, to provide a stroke movement of the piston of small stroke sweep displacement in advance, relative to the stroke movement of the piston of larger stroke sweep displacement of the other cylinder of the pair of combustion cylinders, thereby developing the peak compression pressure within the combustion chamber, when the one of the two combustion chamber pistons having the greatest stroke sweep displacement has reached head end dead center, an advantage to torque development at very low engine speeds, since one combustion piston is in a position with the respective crank pin a considerable distance out of head end dead center when initial combustion takes place, which is advantageous with the use of a separate charge pump cylinder and piston for each combustion unit, inasmuch as the one combustion piston of advance movement, permits the opening of the exhaust ports with a desirable lead, in relative timing and the closing of the exhaust ports, early relative to the position of the crank pin of the crankshaft, to which the piston of the related charge pump cylinder is connected, facilitating a very substantial increase in fresh charge volume supercharge, without the loss of a part of the fresh charge out through the exhaust ports during the scavenging period.

Since the exhaust ports of my improved engine are formed in the wall of the combustion cylinder, having the piston of least stroke sweep displacement and the transfer ports are formed in the wall of the other cylinder of the dual cylinder combustion chamber, having the piston of greatest stroke sweep displacement, it will be seen that I accomplish the opening of the exhaust port for a time period before the opening of the transfer ports, sufficient to permit the release of enough of the spent products of combustion, from within the dual cylinder combustion chamber, to cause the temperature and pressure of the part of the residual gases remaining in the combustion chamber, when the fresh charge induction begins, by the opening of the transfer ports, to be decreased beyond a point, which might cause pre-ignition of the fresh charge or impair the volumetric of the inflow of the fresh charge.

Third, by the combination as described, I provide an engine of very simple structure, of very few parts, silent in operation, with longevity of working parts, the two pairs of combustion cylinders comprising the two dual cylinder combustion chambers, the two single cylinder charge pumping cylinders and one single piston valve comprising a seven cylinder functional unit. A pair of these units, arranged in V formation with cylinder axes disposed 90° apart will provide a union of reciprocating forces, which may be perfectly balanced, by the use of counter weights attached to the crankshaft.

With the foregoing and other objects in view, my invention consists in certain novel features of construction, and relative combination of parts that will be hereinafter more fully described and claimed and illustrated in the accompanying drawings in which:

Fig. 1. is a longitudinal section taken through the center of an internal combustion engine constructed in accordance with my invention.

Fig. 2. is a diagrammatic view that graphically illustrates the relative positions of the crank pins of the crankshaft of my improved engine as taken endwise of the crankshaft from the end shown without a flywheel and the clockwise rotative movement being indicated by the arrows.

Referring to the numerals to the accompanying drawings which illustrate a practical embodiment of my invention "10" designates a cylinder block, in which seven cylinders comprising two combustion and charge pumping units are functionally related by a single fresh charge admission member, the seven cylinders are arranged with the axis of each cylinder centered on a line parallel the axis of the crankshaft "11", which is suitably journalled in a crank case "12" by main bearings "13".

The two cylinders arranged at each end of the row of seven cylinders are adapted to combustion and the cylindrical chambers of the adjacent pair at each end of the row, are commonly joined at their ends by a compression and combustion clearance chamber "14", which forms each end pair of cylinder chambers into one combustion chamber, charge pumping cylinders "15" and "16" are arranged as the third cylinders from each end, with a piston valve cylinder "17", formed as the center cylinder of the row.

A cylinder head "18", is detachably arranged to the head end of the row of cylinders, and the two clearance chambers "14", which join the two end pairs of cylinder chambers are formed in this cylinder head, the cylinder head may be formed separately or cast integral with the cylinder block as desired.

A spark plug "19", or other suitable ignition means, is located in the wall of the clearance chamber "14", which joins the two end cylinders and preferably directly over the second cylinder from the end.

Exhaust ports "20", are formed in the wall of the combustion cylinder first from each end of the row and fresh charge transfer ports "21", are formed in the wall of the combustion cylinder second from each end of the row, the fresh charge transfer port "21", of each combustion cylinder second from each end of the row of cylinders, has a short transfer duct "22", establishing passage communication between the combustion cylinder chamber second from each end of the row and the adjacent charge pump cylinder chamber "23", being third from each end of the row, the exhaust ports "20", the fresh charge transfer ports "21", and the fresh charge transfer duct "22", occupy a plane at right angle to the axes of the cylinders and at a point slightly headward of the position of the head end of the pistons within the combustion cylinders, when the said pistons are in a position of crank end dead center.

Power pistons "24", are arranged for reciprocatory movement within the combustion cylinders "25", first from each end of the row, power pistons "26", are arranged for reciprocatory movement within the combustion cylinders "27" second from each end of the row, charge pumping pistons "28", are arranged for reciprocatory movement within the charge pumping cylinders "15" and "16", which are the third cylinders from each end of the row and a single fresh charge admission piston valve "29", is arranged for reciprocatory movement within the valve cylinder "17", which is in the center of the row of cylinders.

A fresh charge supply duct "30" is formed through the cylinder head "18" and coincides with the axis of the bore of the piston valve cylinder "17", fresh charge inlet ducts "31" and "32" provide passage communication between the chamber of the piston valve cylinder "17" and the two charge pump chambers "23", one on each side of the piston valve cylinder.

Extending headwardly from the head of the piston valve "29", is a cylindrical skirt "34" and formed through this cylindrical skirt are openings "35", the ducts "31" and "32" enter the piston valve cylinder at two points, axially stepped relative to the axis of the piston valve cylinder, the openings "35", through the piston valve skirt are oppositely disposed. Thus, it will be seen that the reciprocation of the piston valve "29", provides alternatingly, a fresh charge passage communication between the piston valve cylinder "17" and one, then the other, of the two adjacent charge pump cylinder chambers "23".

The pistons within the seven cylinders comprising a row of cylinders, are separately connected to the crankshaft by conventional connecting rods.

There is a separate crank pin throw, of a different crank pin axis for the piston of each of the seven cylinders, for the purpose of providing means of transmitting to the crankshaft the power developed by initial combustion, within the combustion chamber, at the moment the combustion chamber is of a minimum space. I arrange the pair of adjacent combustion cylinders, formed as the first and second cylinders from each end, of different piston stroke sweep displacement, permitting the arrangement of one crank pin, of the pair of adjacent crank pins, in advance rotatively of the other crank pin, of the adjacent pair of crank pins, crank pins "37" and "38" are the first crank pins from each end of the crankshaft and are arranged rotatively in advance of the adjacent charge pump crank pins "39" and "40."

The first combustion cylinders of each end are of the least piston stroke sweep displacement and the pistons of the first combustion cylinders of each end of the row of cylinders, are connected to the crank pins of the crankshaft, in advance rotatively, relative to the second crank pins of the crankshaft from each end, this provides an early exhaust port opening, without the exhaust port being of very great height axially with respect to the cylinder and early exhaust port cut-off, facilitating supercharging, without loss of fresh charge during the scavenging period.

The charge pumping pistons "28" within the charge pumping cylinders "15" and "16," are separately connected, one to each of the two crank pins "39" and "40," being the third crank pins respectively from each end of the crankshaft.

The first crank pins from each end of the crankshaft are disposed relatively 180° apart, the second crank pins from each end of the crank shaft are disposed relatively 180° apart, the third crank pins from each end of the crankshaft are disposed relatively 180° apart and the center crank pin "43," of the seven crank pin crankshaft is disposed approximately 55° in advance rotatively relative to the crank pin "39" and 125° late rotatively relative to the crank pin "40."

Assuming the inlet ducts "31" and "32," the openings "35" and the stroke of the piston valve are related in stroke height stroke movement, which will cause the inlet passage communication between the piston valve chamber and either of the adjacent charge pumping chambers, to be of a time duration, equal the time period of the piston valve crank pin "43," rotary movement of 180°, a valve timing of lag in opening after head end dead center and lag in closing after crank end dead center of equal time, for the purpose of developing an atmospheric pressure in the charge pump chambers, after the supercharge function of the pump, wherein a pressure slightly greater than atmospheric will exist. I prefer to cause the inlet port to open to the charge pump when the charge pump has moved crankward approximately 35° after head end dead center, thus, with a 180° inlet valve time open duration, I provide a 35° inlet valve closing lag, after crank end dead center. This timing can be modified to the wish of the designer.

For the purpose of dividing the two pair of dual combustion cylinder pistons and the two charge pump pistons into four reciprocative forces, I arrange the crank pins to which the charge pump pistons are connected relatively 90° apart, from the mean axis between the two end crank pins of the crankshaft, this arrangement when constructed of two 90° V units, comprises substantially the same elements of force to be considered in balancing, as found in the conventional eight cylinder 90° V four cycle engine, having four crank pins, with the end crank pins disposed relatively 180° apart, the two center crank pins disposed relatively 180° and with the first and second crank pins spaced relatively 90° apart, wherein a counter weight of the crankshaft is used to counter the entire reciprocative forces developed.

The operation of my improved engine is as follows; assuming the parts to be in a position as illustrated in Fig. 1 of the accompanying drawing, the piston of the second combustion cylinder from a given end is in the position of head end dead center, the piston of the second combustion cylinder of the opposite end is in the position of crank end dead center, the piston of the first combustion cylinder of the given end is in the relative position after head dead center with the crank pin to which it is attached, 25° after head end dead center and the piston of the second combustion cylinder from the opposite end in a position after crank end dead center with the crank pin to which it is attached 25° after crank end dead center.

At this moment the piston within the charge pump cylinder, third from the given end is in a position approximately two-thirds crankward on the suction stroke, with the crankpin to which it is attached 77½° before crank end dead center, and the piston within the charge pump cylinder, third from the opposite end is approximately half way headward on the transfer stroke, with the crank pin to which it is attached in a position 77½° before head end dead center.

At this moment the piston valve "29" is in a position approximating crank end dead center, the crank pin to which it is attached being 22½° before crank end dead center.

Within the combustion chamber of the given end wherein the pistons are on head end dead center, ignition is provided and combustion takes place therein, at this moment a fresh charge is being drawn into the adjacent pump cylinder "15," through the piston valve "29," the exhaust ports "20" of the combustion cylinder first from the opposite end are about to be closed, fresh charge is being transferred from the charge pump cylinder "16," through the transfer duct "22," into the combustion cylinder second from the given end, the inlet passage communication between the pump cylinder "16" and the valve cylinder "17," is closed by the headwardly extending skirt of the piston valve "29."

The pair of combustion pistons of the given end and at head end dead center, are forced crankwardly through the cylinders by the pressure of the combustion and at the moment the advance crank pin to which the piston of the dual cylinder combustion chamber of least stroke sweep displacement reaches a point 45° before crank end dead center, the said piston head will uncover the exhaust ports "20," formed in the wall of the respective cylinder "25," at this moment the late piston of the pair of dual cylinder chamber pistons will be in a stroke position relative to a crank pin position 70° before crank end dead center.

The further movement of the crankshaft by 15° will move the two dual cylinder combustion chamber crank pins to the positions, advance crank pin 30° before crank end dead center and late crank pin 55° before crank end dead center, at this moment the fresh charge transfer ports formed in the wall of the combustion cylinder second from the end of the row, will be uncovered by the crankward movement of the late combustion piston. Thus it will be seen that I provide a 15° crank rotation time duration exhaust port opening lead, before opening the fresh charge transfer port to the combustion chamber, at this moment the crank pin of the adjacent charge pump will be in a position 47½° after crank end dead center, a time period relative to 12½° after the inlet valve closed to the charge pump chamber.

The transfer port opening by the late combustion piston and crank pin movement, over crank end dead center, for a period relative to the time the crank pin passes from 55° before crank end dead center, to 55° after crank end dead center, provides a total transfer port open duration of 110°, when the advance combustion piston crank pin reaches a point 45° after crank end dead center, the said piston head of the advance piston will close the exhaust ports, at this moment the late combustion piston will have a crank position 20° after crank end dead center and the adjacent charge pump crank pin will be in a position 57½° before head end dead center.

To obtain the greatest possible supercharge of the combustion chamber, without loss of fuel mixture out the exhaust ports, the charge pump should be in size of displacement of a ratio to the dual cylinder combustion chamber, which will provide, the charge pump piston sweep displacement relative to the piston movement, from a charge pump crank pin position 35° after crankend dead center, when the inlet valve closed to the charge pump chambers, to the charge pump crank pin position 57½° before head end dead center, at which time the exhaust port is closed, equal to the total space displacement of the dual cylinder combustion chamber at this moment, with both combustion pistons very near crank end dead center, the advance piston crank pin being 45° after and the late piston crank pin being 20° after crank end dead center, the relative pump piston sweep displacement effected by the rotation of the charge pump crank pin from 35° after crank end dead center to 57½° before head end dead center, scavenging the entire combustion chamber, providing a supercharge in so far as the conventional four cycle engine is concerned, of what ever ratio the ratio of the compression clearance space is of the dual cylinder combustion chamber, to the dual piston sweep of the said combustion chamber.

The further movement of the crankshaft of 35° will cause the advance combustion piston crank pin, to be in a position 80° after crank end dead center, the late combustion crank pin to be in a position 55° after crank end dead center, at which moment the transfer ports are closed by the headward movement of the late combustion piston "26," and the charge pump crank pin to be in a position 22½° before head end dead center, the charge pump piston is approximately at head end dead center when the crank is 22½° before head end dead center, thus during the last 35° of crankshaft rotation, a further supercharge of the combustion chamber is accomplished.

The supercharge by scavenging the compression clearance chamber of the combustion chamber is about 25%, if a 4:1 compression ratio is employed, and the additional supercharge provided by the induction of fresh charge into the combustion chamber for 35° of crank movement after the exhaust port is closed, can be considered as providing a full 25% more supercharge, providing a 50% supercharge capacity, without over induction during the scavenging period.

The further movement of the crankshaft of 125° will return the combustion pistons to the point of greatest compression, the advance small displacement piston being of a crank pin position 25° after head end dead center and the late combustion piston being of a crank pin position at head end dead center, at which time combustion again takes place within the combustion chamber.

It will be understood that one dual combustion cylinder unit and charged pump has no related function with another duplicate unit, other than one inlet valve located between two charge pumps provides the inlet function to the pair of charge pumps.

By this arrangement, I provide a very simple combination, with a considerable supercharging capacity, silent in operation, eliminating the need of an auxiliary timing shaft and timing gears, capable of developing a very great increase of torque at all speeds and especially at real low engine speeds, which is very desirable in the application of the internal combustion engine to the automobile.

It will be understood that minor changes in the size, form and construction of the various parts of my improved engine may be made and substituted for those herein shown and described without departing from the spirit of the invention, the scope of which is set forth in the appended claims.

I claim as my invention:

1. In a two stroke cycle internal combustion engine, the combination of seven cylinders, consisting of four combustion cylinders, two charge pumping cylinders and a valve cylinder, the seven cylinders arranged in a row, the first two cylinders from each end of the row being adapted to combustion, the third cylinders from each end of the row being adapted to charge pumping and the center cylinder of the row being adapted to inlet valvular function to the two charge pumping cylinders.

2. In an internal combustion engine, two combustion chambers, two charge pumping chambers and one inlet valve chamber, each of the two combustion chambers having two cylindrical chambers, pistons arranged for reciprocatory movement within each of the combustion, charge pumping and valve chambers, a crankshaft, seven crank pins of the crankshaft, each of the seven crank pins of the crankshaft being of a different axis, and separate connections between the pistons and the seven crank pins of the crankshaft.

3. In a two stroke cycle internal combustion engine, seven cylinders arranged in a row, exhaust ports formed in the walls of the first cylinders from each end of the row of cylinders, transfer ports formed in the walls of the second cylinders from each end of the row of cylinders, a passage communication between the said transfer ports formed in the wall of each of the second cylinders from each end of the row of cylinders and the chamber of the adjacent and third cylinder from each end of the row of cylinders, and in an inlet passage communication between each of the cylinder chambers being third from the ends of the row of cylinders and the center cylinder.

4. In an internal combustion engine, the combination of two dual cylinder combustion chambers, of two single cylinder charge pumping chambers, of a single piston valve cylinder chamber, of a connecting passage between each of the two single cylinder charge pumping chambers and the single piston valve cylinder chamber, of a connecting passage between one of the two single cylinder charge pumping chambers and one of the cylinder chambers of one of the two dual cylinder combustion chambers, and a connecting passage between the other of the two single cylinder charge pumping chambers and one of the cylinder chambers of the other of the two dual cylinder combustion chambers, and an outlet passage from each of the other cylinders of the two dual cylinder combustion chambers.

5. In a two stroke cycle internal combustion engine, a crankshaft, seven cylinders arranged in a row, the seven cylinders being axially parallel and the axis of the row of seven cylinders being parallel with the axis of the crankshaft, the first and second cylinders from each end of the row of seven cylinders being formed as two end pairs of cylinders, each adjacent pair of end cylinders of the row being joined by a common compression clearance space forming each adjacent pair of end cylinders into a dual cylinder combustion chamber, the two cylinders being the third cylinders from each end of the row of seven cylinders being adapted to charge pumping and the center cylinder of the row of seven cylinders being adapted to valvular function.

6. In a two stroke cycle internal combustion engine, four combustion cylinders, two charge pumping cylinders and a piston valve cylinder formed in a row, pistons arranged for reciprocatory movement within the four combustion cylinders, the two charge pumping cylinders and the piston valve cylinder, a crankshaft and a separate connection between each of the pistons and the crankshaft, the first and second cylinders from each end of the row of cylinders being joined at the head end by a common compression clearance chamber, the third cylinder from each end of the row of cylinders being adapted to charge pumping and the center cylinder of the row of cylinders being adapted to fresh charge inlet valve function to the chambers of the said two fresh charge pumping cylinders.

7. In an internal combustion engine, seven cylinders arranged in a row, pistons arranged for reciprocatory movement within the seven cylinders, a crankshaft, seven crank pins of the crankshaft, the seven crank pins of the crank shaft being spaced apart radially relative to the axis of the crankshaft, each crank pin having a different axis, the first crank pin from each end of the crankshaft being in advance rotatively relative to the position of the second crank pin from each end of the crankshaft, the first and second cylinders from each end of the row of cylinders being joined by a common compression clearance space, the first crank pins from each end of the crankshaft being disposed relatively 180° apart, the second crank pins from each end of the crankshaft being disposed relatively 180° apart, the third crank pins from each end of the crankshaft being disposed relatively 180° apart, and the third crank pin of the crankshaft from a given end being disposed relatively 90° apart of the mean axis of the pair of crank pins first and second from the given end, the said third crank pin from a given end of the crankshaft being arranged in advance relatively rotatively of the said first and second crank pins from the given end of the crankshaft.

8. In a two stroke cycle internal combustion engine, the combination of seven cylinders arranged in a row, pistons arranged for reciprocatory movement within the seven cylinders, of a crankshaft having seven crank pins, the axis of the row of cylinders being parallel with the axis of the crankshaft, the first and second cylinders from each end of the row of cylinders being arranged as a pair of dual cylinder combustion chambers, the first and second cylinders from each end of the row of cylinders being joined at the head end by a compression clearance chamber common to the adjacent pair of cylinders, of exhaust ports formed in the wall of the first cylinders from each end of the row of cylinders, of transfer ports formed in the wall of the second cylinder from each end of the row of cylinders, of a connecting passage between the chambers of the second and third cylinders from each end of the row of cylinders, of a connecting passage between the chambers of the third cylinders from each end of the row of seven cylinders and the chamber of the center cylinder, of a differential in the stroke sweep displacement between the pistons within the first and second cylinders from each end, the stroke sweep displacement of the pistons within the two end cylinders being less than the stroke sweep displacement of the pistons within the second cylinders from each end of the row of cylinders, the pistons within the end cylinders of the row of cylinders being separately connected to the end crank pins of the crankshaft, the end crank pins of the crankshaft being in advance rotatively relative to the position of the second crank pins from each end of the crankshaft, the pistons within the second cylinders from each end of the crankshaft being separately connected to the second crank pins from the respective ends of the crankshaft, the piston within the center cylinder of the row of cylinders being separately connected to the center crank pin of the seven crank pin crankshaft, the first crank pins from each end of the crankshaft being relatively disposed 180° apart, the second crank pins from each end of the crankshaft being relatively disposed 180° apart, the third crank pins from each end of the crankshaft being relatively disposed 180° apart, the axis of the third crank pin from a given end of the crankshaft being relatively disposed 90° in advance rotatively of the mean center between the axes of the first and second crank pins from the given end of the crankshaft and ignition means in the clearance chamber of each pair of end cylinders.

In testimony whereof, I affix my signature

EVERETT R. BURTNETT.